US005560568A

United States Patent [19]
Schmittle

[11] Patent Number: 5,560,568
[45] Date of Patent: Oct. 1, 1996

[54] RECOVERY SYSTEM AND METHOD FOR CAPTURING AND SECURING AN AIR VEHICLE TO LANDING PLATFORM

[75] Inventor: Hugh Schmittle, Westminster, Md.

[73] Assignee: Freewing Aerial Robotics Corporation, College Park, Md.

[21] Appl. No.: 261,901

[22] Filed: Jun. 15, 1994

Related U.S. Application Data

[63] Continuation-in-part of Ser. No. 7,130, Jan. 22, 1993, Pat. No. 5,395,073.

[51] Int. Cl.⁶ ..................................................... B64C 3/38
[52] U.S. Cl. .................. 244/48; 244/110 F; 244/110 E; 244/139; 244/114 R; 244/120; 446/901; 446/225; 273/346
[58] Field of Search ........................... 244/110 E, 110 F, 244/139, 114 R, 48, 100 A, 120; 446/901, 225; 273/346, DIG. 30

[56] References Cited

U.S. PATENT DOCUMENTS

| | | |
|---|---|---|
| 1,306,860 | 6/1919 | Smith . |
| 1,315,320 | 9/1919 | Mesurier . |
| 1,362,292 | 12/1920 | Gunderson . |
| 1,392,140 | 9/1921 | Gernsback . |
| 1,556,348 | 10/1925 | Ray et al. . |
| 1,558,130 | 10/1925 | Westcott . |
| 1,562,549 | 11/1925 | Hall . |
| 1,607,238 | 11/1926 | Cahill . |
| 1,625,020 | 4/1927 | Diago . |
| 1,739,193 | 12/1929 | Ward . |
| 1,820,062 | 8/1931 | Gafney . |
| 2,859,928 | 11/1958 | Snow . |
| 2,984,438 | 5/1961 | Arnold . |
| 3,276,728 | 10/1966 | Partridge . |
| 3,477,664 | 11/1969 | Jones ........................................ 244/48 |
| 3,653,611 | 4/1972 | Trupp et al. ............................. 244/48 |
| 3,727,716 | 4/1973 | Jenkins ............................... 244/100 A |
| 3,730,459 | 5/1973 | Zuck ........................................ 244/48 |
| 3,894,609 | 7/1975 | Wulf . |
| 3,966,142 | 6/1976 | Corbett et al. ......................... 244/120 |
| 4,124,180 | 11/1978 | Wolowicz ............................... 244/48 |
| 4,298,175 | 11/1981 | Earl ..................................... 244/100 A |
| 4,311,290 | 1/1982 | Koper . |
| 4,834,321 | 5/1989 | Granger . |
| 4,923,145 | 5/1990 | Broadhurst .......................... 244/100 A |
| 5,039,034 | 8/1991 | Burgess et al. . |
| 5,201,478 | 4/1993 | Wooley .................................. 244/120 |
| 5,259,574 | 11/1993 | Carrot .................................... 244/139 |
| 5,316,294 | 5/1994 | Turangan .......................... 273/DIG. 30 |

FOREIGN PATENT DOCUMENTS

| 416284 | 5/1910 | France ..................................... 244/48 |
|---|---|---|

*Primary Examiner*—Andres Kashnikow
*Assistant Examiner*—Tien Dinh
*Attorney, Agent, or Firm*—Lowe, Price, LeBlanc & Becker

[57] ABSTRACT

Apparatus and method for recovering and arresting an aircraft on a floating platform is disclosed. The aircraft has a fuselage, a wing, and a source of propulsion for propelling the aircraft in flight. During landing approach, an inflatable cushion attached to the fuselage is deployed below the fuselage via inflation. In the inflated condition, a fastening material disposed on a downward facing surface of the cushion is thereby adapted to adhesively contact the floating platform deck so that the forward motion of the aircraft is slowed and arrested. In the preferred embodiment, the fastening material is one of male or female VELCRO® which is adapted to mate with corresponding VELCRO® material covering the platform deck.

17 Claims, 1 Drawing Sheet

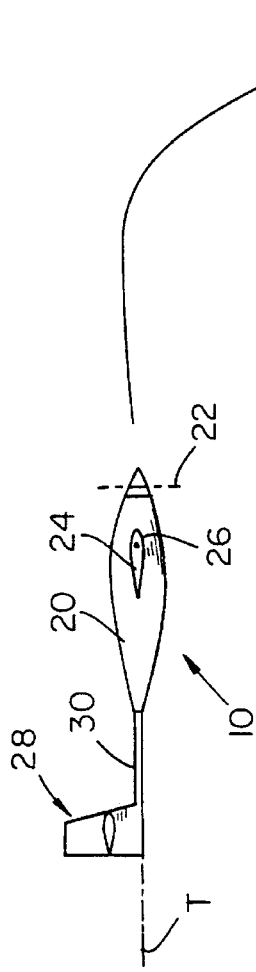
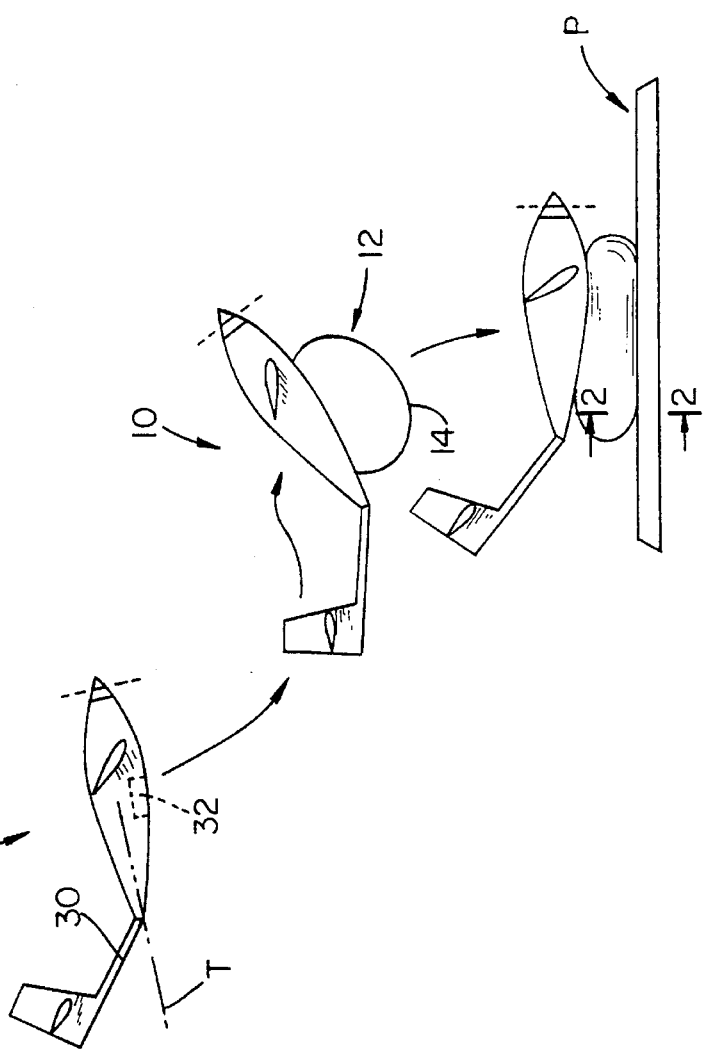
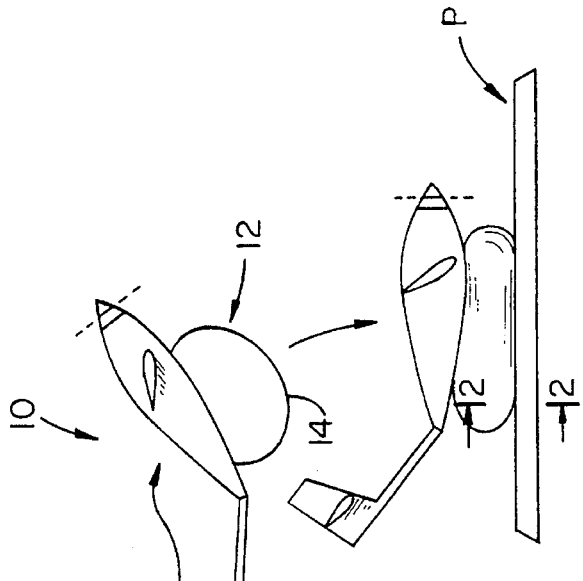
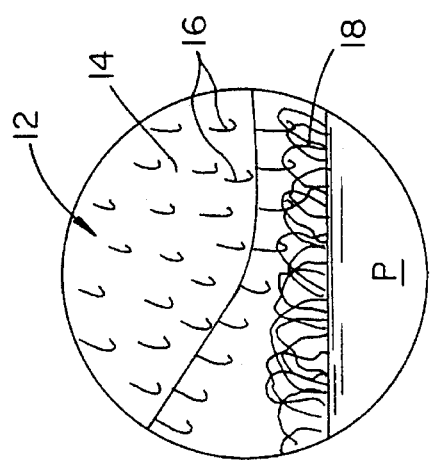

RECOVERY SYSTEM AND METHOD FOR CAPTURING AND SECURING AN AIR VEHICLE TO LANDING PLATFORM

RELATED APPLICATIONS

The present application is a continuation-in-part of prior application Ser. No. 08/007,130, filed Jan. 22, 1993, and is now a U.S. Pat. No. 5,395,273 entitled "STOL/VTOL Free Wing Aircraft With Articulated Tail Boom" the disclosure of which is incorporated by reference herein in its entirety.

TECHNICAL FIELD

The present invention relates generally to short field and vertical take-off and landing (STOL/VTOL) aircraft and, more particularly, to the landing of such aircraft in confined areas such as a floating platform deck on a ship.

BACKGROUND ART

Free wing aircraft may be used in STOL/VTOL applications where short landing and take-off distances are required. Free wing aircraft are relatively immune to turbulence and the like and also may provide high lift and good anti-stall characteristics since the free wing is generally free to pivot or rotate about its spanwise axis and thereby prevent excessive wind loading. As used in this present specification, a free wing or "freewing" is a wing attached to an aircraft fuselage in a manner such that the wing is freely pivotable about its spanwise axis preferably forward of its aerodynamic center. This arrangement enables the wing to have an angle of attack which is determined solely by aerodynamic forces acting on the wing. Rotation of the wing, without pilot intervention, induced by changes in the direction of relative wind over the wing surfaces, causes the angle of incidence between the wing and the aircraft fuselage to vary so that the wing presents a substantially constant angle of attack to the relative wind which, in horizontal flight, enable the aircraft to have such STOL free characteristics.

The aforesaid characteristics make the free wing particularly useful for STOL/VTOL aircraft, particularly for remotely piloted vehicles (RPV's) or unmanned aerial vehicles (UAV's). The stability of the free wing makes it an ideal aerial platform for instrumentation mounts (e.g., video camera, infrared sensor or the like).

Various technologies involving the use of a freewing in an aircraft having STOL and/or VTOL characteristics have been developed by the assignee of the present invention. One such technology is disclosed and claimed in prior application Ser. No. 07/850,913, filed Mar. 13, 1992, entitled "VTOL Free Wing Aircraft," wherein FIG. 1 therein (the relevant drawing figure and related disclosure of which is incorporated by reference herein in its entirety) depicts a STOL/VTOL free wing aircraft comprising a fuselage, a tail section, and a free wing with a propulsion system including an engine at the forward end of the fuselage for driving a propeller. The free wing is free to rotate or pivot about its spanwise axis and includes left and right wings extending from opposite sides of the fuselage. These wings are coupled together to collectively freely pivot about the spanwise axis. The aircraft therein further includes rudders and elevators in a tail section of the fuselage which may be controlled in a conventional manner for yaw and pitch control, respectively.

The operation of the VTOL free wing aircraft disclosed therein is as follows. At launch, the aircraft is mounted in a vertical orientation such as on a rail system which may comprise simply a guide or a track, and complementary guide or track following members on the aircraft for guiding the aircraft from vertical movement for a limited initial predetermined distance at lift-off. With the engine started and propeller backwash providing an air flow over the wings, the aircraft lifts off the launch rail. Catapult assist may also be provided. Yaw and pitch controls are maintained by the rudder and elevator, respectively. The air flow over the wings provides dynamic forces on the wings to control the roll of the aircraft during launch. The wings and launch are freely rotatable and the dynamic pressure on all control surfaces as a result of backwash from the propulsion system is intended to allow roll, pitch and yaw control over the aircraft during the initial phases of vertical launch.

To transition from vertical or horizontal flight, the pilot, computer or remote controller gives a downward elevator signal, causing the fuselage to pitch towards a horizontal orientation. By pitching the fuselage, the thrust vector also inclines from the vertical and thus has a horizontal thrust component. As the fuselage pitches toward the horizontal, the horizontal speed of the aircraft increases, causing the freely rotatable wing to rotate relative to the fuselage in accordance with the relative wind. The effects of the relative wind acting on the freely rotating wing quickly overcome the effects of the air flow over the wings from the propulsion system and, with increasing horizontal speed, the wing develops lift. The aircraft soon transitions into horizontal flight in a free wing flight mode.

To transition from horizontal to vertical flight, such as during landing, the reverse procedure is employed. That is, an up elevator command is given to rotate the fuselage toward a vertical orientation with its nose pointed upwardly. Horizontal speed is thus decreased and a vertical thrust vector is introduced. Accordingly, the relative wind changes and the thrust line and fuselage ultimately both rotate into a vertical or near vertical orientation. If the aircraft resists slowing and does not reduce its forward or horizontal speed sufficiently, the fuselage, by operation of the elevator, could be rotated past vertical so that the thrust line possibly serves as a thrust reverser, slowing the aircraft past STOL. Other slowing means are also possible.

In this embodiment, since the tail section is fixed to the fuselage and thereby immovable relative to the longitudinal axis and the thrust axis of the fuselage, relatively sophisticated recovery systems are necessary, such as extremely long and complex landing gear extending downwardly below the tail section in the vertical or near vertical flight landing mode as would be necessary for STOL and VTOL operations. This type of landing gear (e.g., a so-called moon rocket landing gear) would be extremely expensive and effective for use only on substantially level terrain.

Another free wing aircraft having thrust vectoring characteristics for propelling the aircraft in a horizontal flight mode and in a short field take-off and landing (STOL) flight mode is disclosed in the aforementioned '130 patent application. Therein, a fuselage including a source of propulsion is formed with a tail boom connected to extend rearwardly from the fuselage. The tail boom is formed with horizontal tail surfaces and vertical tail surfaces to provide for directional stability and yaw control. A mechanism is provided for relatively rotating the fuselage relative to the tail boom about an axis of rotation extending parallel to or coincident with the spanwise axis. This relatively rotating mechanism is operable to position the thrust line of the fuselage into an angle approaching, or of, 90° relative to a longitudinal axis of the tail boom to enable the thrust of the propulsion system to propel the aircraft in the STOL flight mode.

The latter embodiment enables the use of less expensive and more practical, shorter types of landing gear wheel assemblies in comparison with the much longer landing gears required for the first described VTOL/STOL aircraft. Unfortunately, however, the use of landing wheels in the aforementioned STOL free wing aircraft formed with the articulated tail boom does not ensure that the aircraft will be capable of coming to a reliable stop such as when attempting to land in a comparatively confined space as for example on a ship's deck or a floating oil platform. Since the use of the aforementioned free wing aircraft have particularly promising applications when employed in an RPV or UAV type of free wing aircraft which must be recovered on such floating platform environments, it would be particularly desirable to provide a free wing aircraft having vertical and/or short take-off and landing capabilities (STOL/VTOL) without requiring either complicated land-based recovery systems or aircraft based wheel systems.

It is accordingly one object of the present invention to land an aircraft having vertical and/or short take-off and landing capability (STOL/VTOL) without requiring complicated land-based recovery systems for aircraft-based wheel landing systems.

Another object of the invention is to land free wing aircraft having STOL or VTOL capabilities in a confined space such as a ship deck without requiring complex and expensive arrestment systems or wheel-based systems.

DISCLOSURE OF THE INVENTION

An aircraft, according to the present invention, comprises a fuselage including a source of propulsion for propelling the aircraft in flight. An inflatable cushion is attached to project below the fuselage and includes a fastening material disposed on a downward facing surface thereof which adhesively contacts a landing surface during touchdown to slow and arrest aircraft movement.

Preferably such arrestment occurs on a floating platform deck usually located on a body of water. The fastening material is on preferably one of resiliently deformable hook members or loop members adapted to engage the other of resiliently deformable loop members or hook members disposed on the landing surface. Contact between the hook and loop members during landing is what causes the slowing and arrestment of the aircraft.

The invention is preferably used within the environment of a thrust vectoring free wing aircraft having STOL and/or VTOL flight characteristics. In one embodiment, the aircraft includes a fuselage having a source of propulsion for propelling the aircraft in a horizontal flight mode and in a short field take off and landing "STOL" flight mode. A free wing is connected to the fuselage for free pivotal movement relative thereto about a spanwise axis. A tail boom is connected to the fuselage. The tail boom is formed with horizontal tail surfaces and vertical tail surfaces to provide for directional stability and your control. A mechanism for pivoting the fuselage relative to the tail boom about an axis of pivot extending parallel to or coincident with the spanwise axis is also provided. The inflatable cushion is attached to at least one of the fuselage or the tail boom and has the fastening material disposed on a downward facing surface thereof when the cushion is inflated.

In another embodiment, a thrust vectoring free wing aircraft comprises a fuselage and a wing having an aerodynamic center connected to the fuselage for free pivotal movement about a spanwise axis for flight in a predetermined generally horizontal direction in a free wing mode of aircraft operation. A propulsion system carried by the fuselage develops thrust for propelling the aircraft. Aerodynamic surfaces carried by the fuselage are provided for vectoring the thrust of the propulsion system away from the predetermined direction of flight sufficiently to achieve near vertical flight orientation and thereby establish an angle between the fuselage and the direction of flight. An inflatable cushion is attached to the fuselage and is formed with fastening material on a downward facing surface thereof which is capable of adhesive mating with a landing surface upon contact therewith.

The present invention is also directed to a method of landing an aircraft on a floating platform deck preferably located on a body of water. The aircraft which is to be landed may be of the articulated tail boom type according to the invention as described above, or of the type wherein the flight control horizontal and vertical tail surfaces are formed on the fuselage in an aft section thereof, wherein the inflatable cushion is attached to either the fuselage or the tail boom. In accordance with the method of the present invention, the aircraft is flown in a descent flight path toward the floating platform deck. The fuselage is then pivoted (relative to the articulated tail boom) so that the thrust access of the source of propulsion moves away from horizontal plane of reference in the direction of a vertical plane of reference to decrease incident airspeed. In the non-articulated tail boom embodiment, the fuselage is oriented with the tail surfaces so that the thrust axis moves in the direction of the vertical plane of reference. The inflatable cushion is then inflated prior to touch down. Landing and stopping of the aircraft then occurs by contacting the deck with the fastening material on the inflatable cushion so that the forward motion of the aircraft is slowed and then arrested.

Both the aircraft types and methodology of use in accordance with the present inventions provides an effective means for landing both free wing and non-free wing type of aircraft within a confined space such as on a floating platform in a precision manner, and preferably without the need for deploying parachutes as in the prior art. The use of VELCRO® material on the air bag and in a covering position on the landing platform provides a reliable and effective means for arresting forward motion of the aircraft in minimal touchdown distance. The feature of using the VELCRO® type material also provides an effective means for securing the aircraft to the flight deck following arrestment.

The downward facing wall of the inflatable cushion is preferably sufficiently flexible such that it is capable of conforming to the angle of tilt, if any, of the flight deck as may occur during aircraft landing in a high sea state.

In accordance with a further feature of the invention, the air cushion is located such that, when deployed, it is substantially centered with respect to the center of gravity of the aircraft during touchdown. This prevents ground looping or nose diving from occurring during arrestment.

Still other objects and advantages of the present invention will be readily apparent to those killed in this art from the following detailed description, wherein only the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a side elevational view, partly in schematic form, depicting the landing sequence of a free wing STOL aircraft formed with an articulated tail boom in accordance with one embodiment of the present invention; and FIG. 2 is a sectional view taken along the line 2—2 of FIG. 1.

BEST MODE FOR CARRYING OUT THE INVENTION

FIG. 1 is an illustration of an aircraft, partially schematically identified with reference numeral 10, in final approach for landing on a confined space which may be, for example, a floating platform which is generally designated with reference character P. In accordance with the unique features discussed more fully below, an inflatable cushion or air bag 12 stored within or below aircraft 10 is deployed by inflation prior to touchdown. Cushion 12 includes a downward facing surface 14 which is preferably covered with a plurality of resiliently deformable hook projections 16 while the upwardly directed surface of platform P is covered with resiliently deformable loop projections 18, or vice versa, as best depicted in FIG. 2. Upon touchdown, the mating engagement of hook projections 16 with loop projections 18 (both of which may be male and female VELCRO® material, respectively) causes forward motion of aircraft 10 to abruptly decrease so that the aircraft is slowed and arrested while on the platform. Optionally, cushion 12 may then be deflated soon thereafter to prevent the aircraft from excessive tilting or overturning.

In the preferred embodiment, aircraft 10 may be a free wing aircraft of the type illustrated in FIGS. 2–11 of the aforementioned '130 patent application. FIGS. 2–11 and the relevant disclosure thereof are expressly incorporated by reference herein. As schematically depicted in FIG. 1, free wing aircraft 10 comprises a fuselage 20 containing a propulsion system and propeller 22 at the forward end thereof. A freewing 24 is connected to fuselage 20 and is free to rotate or pivot about its spanwise axis 26 independent of the orientation of fuselage 20. Aircraft 10 further comprises a tail section 28 which is mounted to a boom assembly 30 pivotally connected or articulated to the fuselage 20 for movement relative to the fuselage both into and out of alignment with the thrust line T of the propulsion system 22 to enable STOL operations as well as straight and level flight.

Straight and level flight of STOL free wing aircraft 10 is depicted in the upper lefthandmost drawing of FIG. 1. Assuming the pilot or remote control aircraft operator desires to land the aircraft 10 in a STOL free wing flight mode onto a platform P, the articulated boom 30 is 'raised,' as depicted in the next sequential view of FIG. 1, so that the fuselage 20 and the thrust line T of propulsion system 22 begins to rotate towards a vertical orientation with the aircraft nose beginning to point upwardly. As the fuselage 20 and thrust line T rotate toward the vertical, horizontal forward speed of the aircraft 10 is gradually decreased and the vertical thrust vector gradually increases. The aircraft 10 thus slows and gradually lowers to the ground toward platform P in a final approach configuration. Throughout this transition, the free wing 24 continues to be independently responsive to changes in the relative wind to either continue to provide lift assuming sufficient horizontal speed, or to 'feather' as the vertical thrust vector increases to provide sufficient thrust control. At no time during the transition does the aircraft stall as a result of pivotal movement of the articulated tail boom assembly 30. The feature of swinging or pivoting the entire boom assembly 30 and tail section 28 out of straight and level alignment with the fuselage 20 and thrust line T of propulsion system 22 thereon advantageously results in an aircraft 10 capable of taking off and landing in slow flight or STOL mode while retaining the advantages of free wing flight. This aircraft provides the further advantage of allowing for the utilization of a relatively simple nose gear assembly (not shown) which, under landing conditions wherein landing is not confined to a small space, the design of aircraft 10 lends itself to the use of such relatively simple nose gear assemblies.

However, in an environment where aircraft 10 is to be landed in a confined location such as on a floating platform deck P of an oil rig or a ship deck, the use of a landing wheel assembly is not a reliable means for landing the aircraft since the forward motion of the aircraft upon touchdown may be sufficient to induce a landing distance or roll-out which would carry the aircraft off of the platform P. Therefore, in accordance with a unique feature of the invention, an arrestment system is provided in the form of inflatable cushion 12 which is preferably deployed during final approach prior to touchdown as best depicted in the sequential landing views of FIG. 1 (see third sequential view immediately prior to touchdown).

Inflatable air cushion 12 may be stored within (as at 32) or below fuselage 20 and may be released and rapidly inflated through an on-board pressurized air supply connected to a pilot actuated inflation control valve (not shown) in a manner that will now be obvious to one of ordinary skill in the art based upon a review of the present specification. It is contemplated that inflated cushion 12 may be manufactured and deployed based upon conventional air bag technology as suitably modified to conform to the aforementioned desired design and operating characteristics.

Preferably, since the hook fasteners 16 of male VEL-CRO® material tend to stick to each other, and since cushion 12 may be folded in such a manner in stored position 32 such that hook fasteners 16 contact each other, it is preferred to form the fastening material surface 14 on the air bag 12 with the loop fasteners 18 or female VELCRO® material while the male VELCRO® material 16 is permanently affixed to platform P.

It is also contemplated that the VELCRO® fastening material placed on platform P may normally be stored in the ship or platform and then unrolled onto the upwardly directed surface of platform P immediately prior to landing of an aircraft 10 of the invention. This allows platform P to be used for other purposes without destroying the integrity of the fastening material sheet. One of ordinary skill will now easily appreciate the numerous approaches to storage, rolling, unrolling and affixation of the VELCRO® material onto platform P without further elaboration herein.

It will now be further appreciated that aircraft 10 may be landed in a precision manner since the feature of vectoring the thrust line T of fuselage 20 to reduce forward air speed during final approach offers a more reliable control means in relation to forward speed reduction by means of a parachute. In other words, the feature of thrust vectoring as employed in the present invention provides greater control over forward speed as well as the flight path during final approach to ensure precision landing on platform P.

The novel combination of utilizing a thrust vectoring fuselage 10 together with an inflatable cushion 12 allows the aircraft to be landed in a confined space such as platform P without damaging or unduly stressing the in-flight equipment on-board or the aircraft itself.

The flexible nature of the downwardly directed surface wall of inflatable cushion 12 also lends itself to use during landing in a high sea state when platform P is likely to pitch and therefore tilt to varying degrees. Since the wall material is flexible, it does not necessarily require an initial flush engagement with the upwardly directed surface of platform P. Typically, initial engagement with a portion of the tilted upwardly directed surface of platform P will be followed by a rolling and thereby a flush contact of the material onto the surface of the platform.

It will now also be further appreciated that the specifications for peel strength of the male and female VELCRO® sheet material will be easily determined by an engineer of ordinary skill.

In accordance with a further feature of the invention, the inflatable cushion 12 is preferably disposed so that it is centered with respect to the center of gravity of aircraft 10 at the time of touchdown. This will prevent aircraft 10 from ground looping or flipping over upon impact.

The inflatable cushion 12 preferably communicates with an on-board air release valve which will open to deflate the cushion either upon complete cessation of forward motion or when forward motion is below a predetermined speed. Deflation of cushion 12 advantageously minimizes the tendency of aircraft 10 to either flip over or be buffeted around after landing either by high wind or a high sea state. The manner in which the release valve is attached to the air cushion 12 and actuated by pilot control, or otherwise, will now be obvious to one of ordinary skill in the art from a review of this disclosure.

Although the use of hook and loop fastening sheet material, such as male and female VELCRO® sheets or equivalents thereof, is disclosed as the preferred material, it will now be appreciated by one of ordinary skill in the art that other fastening materials may be used which are capable of providing the desired cessation of forward motion and arrestment as described above. For example, certain types of adhesive glues disposed on the downwardly facing surface of cushion 12 may be capable of sufficient adhesive contact with a coated or uncoated surface of platform P to arrest forward movement.

Although the preferred embodiment is directed to the use of inflatable cushion 12 in combination with a free wing aircraft 10 having an articulated tail boom as disclosed in the '130 patent application, aircraft 10 may also be representative of other free wing aircraft, formed, for example, without articulated tail booms, such as the thrust vectored free wing aircraft disclosed in FIG. 1 of the aforesaid 130 patent application. This aircraft of FIG. 1 is incorporated by reference herein together with the related written disclosure.

The present invention also contemplates the use of a recovery system disclosed hereinabove with non-free wing or fixed wing aircraft which are capable of achieving sufficiently low forward speeds at the time of landing so as to enable the male and female surfaces 16,18 to adhere to each other in an effective manner to arrest forward motion while the aircraft is on the platform.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A floating platform based recovery system method for landing an aircraft on a floating platform deck on a body of water, said aircraft including a fuselage having a source of propulsion for propelling the aircraft in a horizontal flight mode and in a short field take-off and landing (STOL) flight mode, a free wing connected to the fuselage for free pivotal movement relative thereto about a spanwise axis, a tail boom connected to the fuselage, said tail boom being formed with at least one of horizontal tail surfaces and vertical tail surfaces to provide for directional stability and/or yaw control, a mechanism for pivoting the fuselage relative to the tail boom about an axis of pivot extending parallel to or coincident with the spanwise axis, and an inflatable cushion attached to at least one of the fuselage or tail boom and having a fastening material disposed on a surface thereof, comprising the steps of:

(a) establishing a descent flight path of said aircraft toward said floating platform deck;

(b) pivoting said fuselage relative to said tail boom so that the thrust axis of said source of propulsion moves away from a horizontal plane of reference (x-axis) in the direction of a vertical plane of reference of reference (z-axis) to decrease incident air speed;

(c) inflating said inflatable cushion prior to touchdown; and (d) landing said aircraft by contacting said deck with the fastening material on said inflatable cushion so that the forward motion of the aircraft is slowed and arrested.

2. The method of claim 1, wherein the recovery system is a shipboard recovery system and said floating platform is a ship deck.

3. The method of claim 1, wherein said aircraft descends and air speed decreases without deployment of any on-board parachute(s).

4. The method of claim 1, wherein the aircraft is slowed and arrested in step (d) only by means of contact between said fastening material with said platform.

5. The method of claim 1, wherein said cushion is located so that it is exposed to initially contact said platform on touchdown.

6. The method of claim 1, wherein said cushion is immediately deflated after the aircraft forward motion is arrested.

7. The recovery system of claim 1, wherein said cushion is immediately deflated after the aircraft forward motion drops below a predetermined speed.

8. The method of claim 1, wherein said inflatable cushion is both inflated and disposed to be centered with respect to the center of gravity of said aircraft at the moment of touchdown to prevent ground looping or nose diving.

9. The method of claim 1, wherein the slowing and arresting movement of step (d) occurs by contact of resiliently deformable hook members formed on one of the cushion and platform deck with resilient deformable loop members formed on the other of said resilient cushion and platform deck.

10. The method of claim 1, wherein said air cushion is deployed from a storage location located underneath or within a lower portion of said fuselage or tail boom.

11. The method of claim 1, wherein said aircraft is a remotely piloted vehicle (RPV).

12. A floating platform based recovery system method for landing an aircraft on a floating platform deck on a body of water, said aircraft including a fuselage, a wing having an aerodynamic center and connected to said fuselage for free pivotal movement about a spanwise axis for flight in a predetermined generally horizontal direction in a free wing mode of aircraft operation, a propulsion system carried by said fuselage for developing thrust and propelling the aircraft, said propulsion system propelling said aircraft both in said predetermined direction and in a near vertical flight orientation, and aerodynamic surfaces carried by said fuselage for vectoring the thrust of said propulsion system away from the predetermined direction of flight sufficiently to achieve said near vertical flight orientation, thereby establishing a angle between the fuselage and the direction of flight, and an inflatable cushion attached to said fuselage and having a fastening material disposed on the surface thereof, comprising the steps of:

(a) establishing a descent flight path of said aircraft toward said floating platform deck;

(b) manipulating said fuselage so that the thrust of said propulsion system moves away from a horizontal plane of reference (x-axis) in the direction of a vertical plane of reference (z-axis) to decrease incident air speed;

(c) inflating said inflatable cushion prior to touchdown; and (d) landing said aircraft by contacting said deck with the fastening material on said inflatable cushion so that the forward motion of the aircraft is slowed and arrested.

13. A thrust vectoring free wing aircraft comprising:

(a) a fuselage;

(b) a wing having an aerodynamic center and connected to said fuselage for free pivotal movement about a spanwise axis for flight in a predetermined generally horizontal direction in a free wing mode of operation;

(c) a propulsion system carried by said fuselage for developing thrust and propelling the aircraft, said propulsion system propelling said aircraft both in said predetermined direction and in a near vertical flight orientation;

(d) aerodynamic surfaces carried by said fuselage for vectoring the thrust of said propulsion system away from the predetermined direction of flight sufficiently to achieve said near vertical flight orientation, thereby establishing an angle between the fuselage and the direction of flight; and (e) an inflatable cushion mounted to the fuselage and having a fastening material disposed on a downward facing surface thereof when said inflatable cushion is in inflated condition.

14. A thrust vectoring free wing aircraft comprising:

(a) a fuselage having a source of propulsion for propelling the aircraft in a horizontal flight mode and in a short field take-off and landing (STOL) flight mode;

(b) a free wing connected to the fuselage for free pivotal movement relative thereto about a spanwise axis;

(c) a tail boom connected to the fuselage, said tail boom being formed with at least one of horizontal tail surfaces and vertical tail surfaces to provide for directional stability and/or yaw control;

(d) a mechanism for pivoting the fuselage relative to the tail boom about an axis of pivot extending parallel to or coincident with the spanwise axis; and (e) an inflatable cushion attached to at least of the fuselage and tail boom and having a fastening material disposed on a downwardly facing surface thereof when said inflatable cushion is in inflated condition.

15. The aircraft of claim 13, wherein said fastening material is formed from at least one of resiliently deformable hook members and loop members adapted to adhesively attach to the other of resiliently deformable hook members and loop members covering a landing area.

16. The aircraft of claim 14, wherein said fastening material is formed from at least one of resiliently deformable hook members and loop members adapted to adhesively attach to the other of resiliently deformable hook members and loop members covering a landing area.

17. An aircraft, comprising:

(a) a wing;

(b) a fuselage;

(c) a source of propulsion for propelling said aircraft in flight; and (d) an inflatable cushion mounted to the fuselage and having a fastening material disposed on a downward facing surface thereof when said inflatable cushion is in inflated condition;

wherein said fastening material is formed from at least one of resiliently deformable hook members and loop members adapted to adhesively attach to the other of resiliently deformable hook members and loop members covering a landing area.

* * * * *